Nov. 1, 1960 P. E. ANDERSON 2,958,260
MISSILE LAUNCHING APPARATUS
Filed July 12, 1952 2 Sheets-Sheet 1
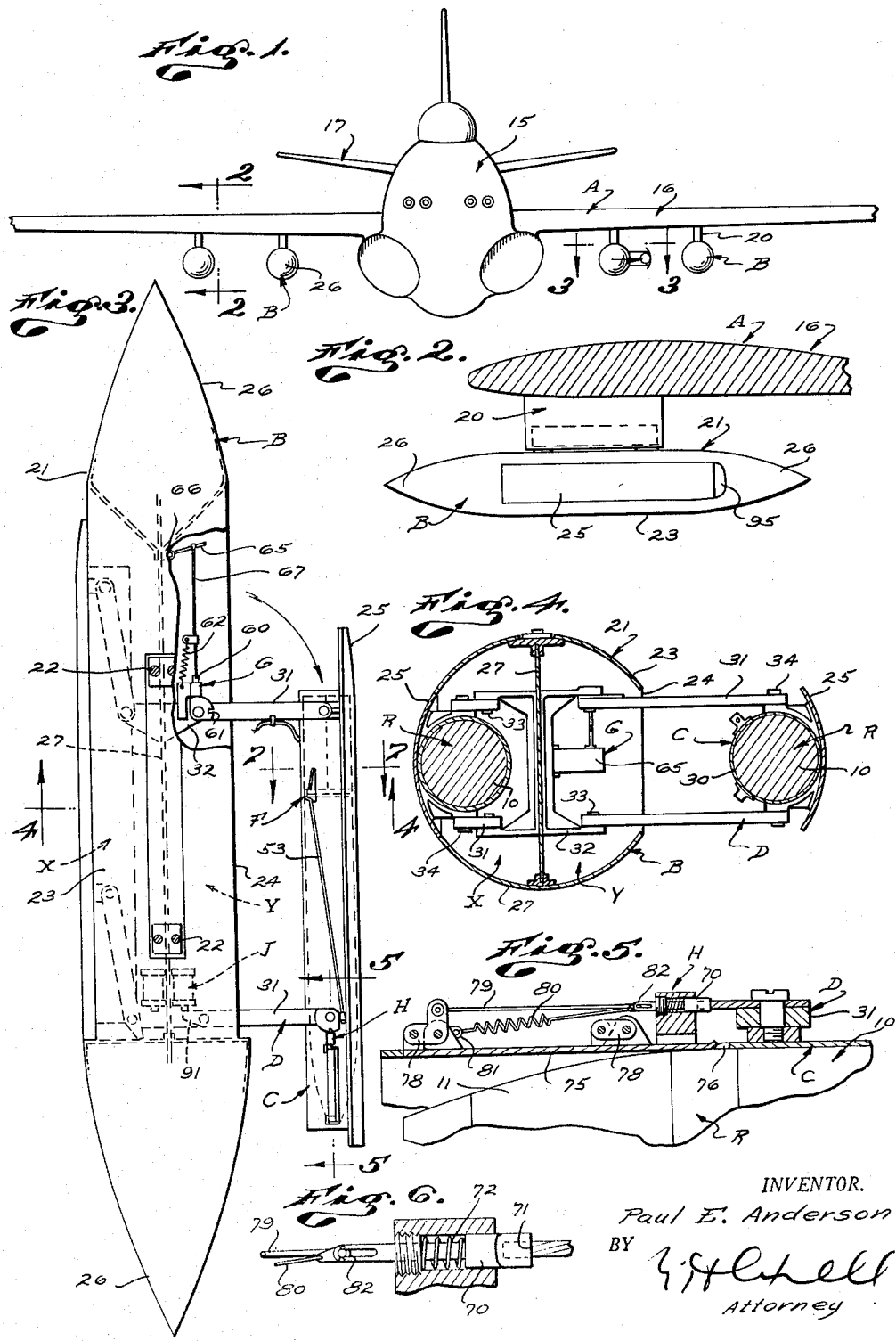
INVENTOR.
Paul E. Anderson
BY
Attorney

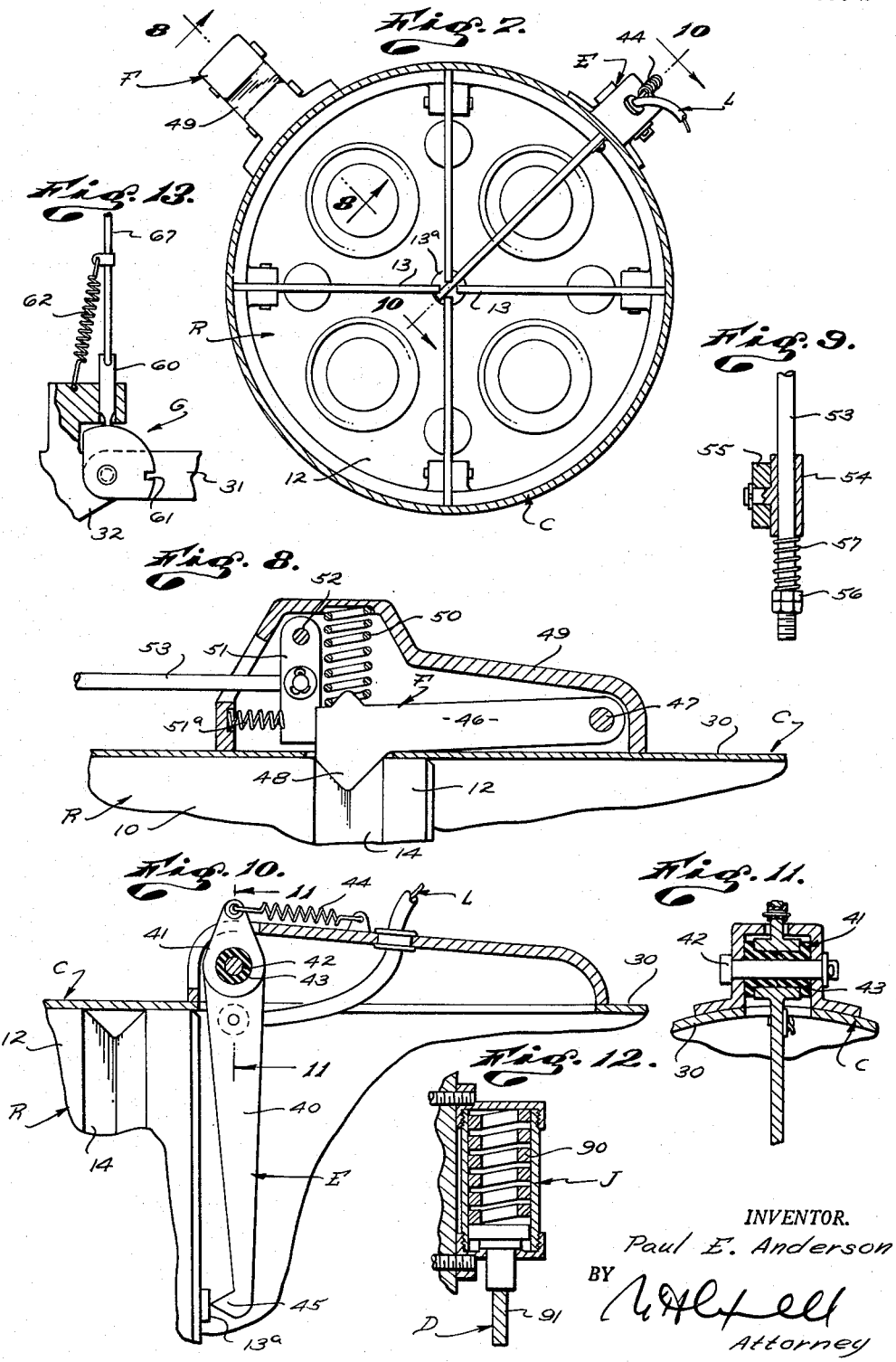

United States Patent Office 2,958,260
Patented Nov. 1, 1960

2,958,260

MISSILE LAUNCHING APPARATUS

Paul E. Anderson, Torrance, Calif., assignor to Harvey Machine Co., Inc., Torrance, Calif., a corporation of California Filed July 12, 1952, Ser. No. 298,538

15 Claims. (Cl. 89—1.7)

This invention relates to missile launching apparatus and it is more specifically concerned with apparatus for launching a missile such as a self-propelled missile or a rocket from a vehicle. It is a general object of the invention to provide a simple, practical, dependable structure normally serving to carry a missile in a contracted position and which is operable to shift the missile to a position clear of the vehicle or support preceding discharge of the missile in a predetermined direction.

The present invention is concerned, generally, with a missile carrying mechanism and it is particularly desirable or practical for the handling of a rocket type missile. Further, the present invention is concerned, broadly, with the handling of a missile on or in connection with a vehicle whether it be a land, water, or air vehicle. The invention is particularly useful and practical for the handling of a missile on or in connection with a vehicle of the heavier than air type, and therefore, in the following description I will refer specifically to a form of the invention and to an application thereof in which the vehicle is referred to as an airplane, it being understood, however, that when I employ the term vehicle I mean to include any form, type, or class of vehicle.

It is a general object of this invention to provide a missile handling device in which the reaction or the blast or stream of discharging gases from the missile itself serves as the means by which the apparatus is operated to shift the missile to launching position or firing position where it is clear of its support and where it is free to be launched in a predetermined direction.

It is a further object of this invention to provide a structure of the general character referred to which is free of complicated, delicate, or cumbersome mechanisms subject to failure and such as to materially add to the weight of the supporting vehicle.

It is a further object of this invention to provide a missile carrying structure of the general character referred to in which the missile and its supporting carrier operate from the normal retracted position to an extended or projected position, from which the missile is launched, without materially effecting or disturbing the action or flight of the vehicle.

It is another object of this invention to provide the apparatus with certain simple, effective dependable controls that assure retention of the missile until it is in launching or firing position and which prevent retraction of the missile carrier until such time as the missile has been launched.

The apparatus of the present invention can be applied to or incorporated in vehicles generally. However, since it is particularly applicable to aircraft it will be referred to in this connection. The structure of the present invention can be applied to or incorporated directly in aircraft of ordinary construction, or, as is herein disclosed, it can be provided in an appendage provided on or incorporated as a part of the aircraft.

In a typical situation the appendage may be supported by means of a strut and may carry one or more units embodying the present invention, which units may be incorporated in a single envelope or housing, suitably shaped or streamlined as circumstances may require. The missile may vary widely in form or character. However, in a typical case the missile may be considered as a self-propelled device or rocket and in a typical case it is an elongate unit, round in cross section, with a pointed nose or warhead and a central motor section at the rear end of which there is a tail portion provided with fins and firing means. Being of the rocket type the missile has one or more exhaust or discharge nozzles from which gases flow to effect the desired flight of the missile.

The structure as provided by the present invention involves, generally, a carrier for the missile which is preferably tubular in form and substantially coextensive with the missile. In a typical situation the carrier is a round barrel-like unit open at the ends and slidably supports the missile. In a preferred form of the invention a section of the exterior of the vehicle or of the envelope in which the missile is normally carried is provided on the exterior of the carrier. A mounting means is provided to support the carrier so that it is operable between a retracted position within the vehicle or within the envelope provided to contain the missile and a projected or working position from which the missile is to be launched. In the case here illustrated the base or support from which the carrier is mounted is located in and may be considered a part of the envelope of the appendage which, in turn, is joined to the exterior of the vehicle. The mounting means involves brackets pivoted to the mounting and also to the missile carrier and serving to operate in parallelism so that if the missile is moved from the retracted position to the launching position the carrier moves out or laterally of the envelope and forward of the vehicle.

A contact means is provided engaging the missile to establish electrical contact with the igniting means of the missile thus placing the missile under control of the operator or personnel in the vehicle. A control is provided normally retaining the missile in the carrier and operates to release the missile when the carrier reaches a fully extended position from which it is launched. A latch means is provided normally holding the carrier retracted and is preferably blast operated so that the initial blast or discharge of gases from the missile releases this latch means freeing the carrier for movement from the retracted position. Another latch means is provided for retaining the carrier in the fully extended or launching position upon its being moved thereto, and it is under control of the missile so that it remains engaged until such time as the missile leaves the carrier. It is further preferred to provide a snubber serving to check or dampen movement of the carrier as it reaches the fully extended or launching position.

The various objects and features of my invention will be fully understood from the following detailed description of a typical preferred form and application of the invention, throughout which description reference is made to the accompanying drawings, in which:

Fig. 1 is a front elevation of a vehicle in the form of an airplane having a plurality of appendages thereon, each of which carries a plurality of units embodying the present invention. Fig. 2 is an enlarged detailed sectional view taken substantially as indicated by line 2—2 on Fig. 1. Fig. 3 is an enlarged plan section taken as indicated by line 3—3 on Fig. 1. Fig. 4 is an enlarged detailed transverse sectional view taken as indicated by line 4—4 on Fig. 1. Fig. 5 is an enlarged detailed sectional view taken as indicated by line 5—5 on Fig. 3. Fig. 6 is an enlarged view of a portion of the mechanism shown in Fig. 5. Fig. 7 is an enlarged detailed sectional view taken as indicated by line 7—7 on Fig. 3. Fig. 8 is an enlarged detailed sectional view taken as indicated by line 8—8 on Fig. 7. Fig. 9 is an enlarged detailed sectional view of a portion of the mechanism shown on Fig. 3. Fig. 10 is an enlarged, detailed sectional view taken as indicated by line 10—10 on Fig. 7. Fig. 11 is a sectional view taken as indicated by line 11—11 on Fig. 10. Fig. 12 is an enlarged detailed sectional view of a snubber provided in the mechanism, and Fig. 13 is an enlarged view of the latch means provided to normally hold the mechanism retracted.

The mechanism provided by this invention is intended to handle a missile such as is commonly referred to as a rocket, and in the drawings I have illustrated in a general way a typical rocket R elongate in form and having a main elongate motor section 10, a war head 11 at the forward end of the motor section, and a tail portion 12 at the rear end of the motor section. In the particular case illustrated a plurality of fins 13 is carried by the tail section 12 of the missile and is operable between a collapsed position where the fins are within the confines of the missile and a projecting or working position where they project radially from the missile. Further, at the center of the tail section 12 there is a contact 13a designed to receive an electrical impulse for the purpose of igniting the missile. Further, in accordance with typical rocket construction the tail portion or section 12 is provided with an annular recess or groove 14.

The structure provided by the present invention is applicable generally to vehicles and within the broader concepts of the invention it is applicable to various vehicles and can be incorporated or connected to the vehicles in various manners. In my copending application entitled "Missile Launching Vehicle," filed on even date herewith, Serial No. 298,537, I describe and illustrate a form of the invention wherein the structure is incorporated directly in the main structure of the vehicle, whereas in this application I illustrate a situation wherein the vehicle is in the form of an airplane A having appendages B, each of which carries a plurality of mechanisms embodying the invention. The particular airplane illustrated involves a fuselage 15, wings 16, tail elements 17 and various other features common to structures of this character. In the particular case illustrated the appendages B are provided on and depend from the wings 16 of the airplane, there being a plurality of appendages B on each wing.

The appendages B, as provided by the invention, can vary widely in form. However, in a typical situation I provide each appendage with a strut portion 20 that depends from the main portion of the airplane and an envelope or housing 21 that is carried by the strut. In practice the strut and envelope may be separable and suitable fasteners 22 may be provided to connect the strut and envelope. In the particular case illustrated the assembly formed by the strut and envelope is a rigid unit which, for all intents and purposes, is a part of the airplane A, the envelope being in a fixed or predetermined position with reference to the main elements of the airplane.

The particular envelope or housing 21 illustrated in the drawings carries two units or mechanisms embodying the present invention and it is characterized by a tubular shell 23 of substantial length and provided with diametrically opposite openings 24 normally covered by closure sections 25 which are supported by the missile carrier, as will be hereinafter described. The shell 23 is of substantial length and has suitably tapered or faired ends 26. A central partition 27 is provided in the shell 23 and is shown as a flat plate diametrically disposed in the shell and extending longitudinally thereof to occur between the openings 24 and thus divide the interior of the shell into two like chambers X and Y (see Fig. 4).

The mechanism provided by the present invention is applied to the envelope or housing 21 so that the partition 27 therein serves as the support to which the mechanism is connected or attached, and in the particular case illustrated two like mechanisms embodying the invention are applied to the single partition 27 being located at opposite sides thereof so that two missiles may be normally supported within the envelope and are operable individually or simultaneously to positions spaced from the envelope from which it is practical to discharge or fire the missiles.

Each mechanism embodying the invention involves, generally, a missile carrier C, mounting means D supporting the carrier C from a support such as the partition 27, so the carrier is shiftable between a retracted position within the envelope and an extended or firing position spaced from the envelope. The invention further provides contact means E by which an electric circuit can be completed to the contact 13a of the missile and control means F normally releasably retaining the missile in the carrier and operated by action of the mounting means D to release the missile when the carrier reaches its fully extended or firing position. A latch means G is provided to normally hold the mechanism in the retracted position and is such as to be operated or released by gases flowing from the missile immediately upon the missile being ignited. A further latch means H is provided to catch and retain the mechanism in the extended or firing position upon its being moved thereto and is under control of the missile so that it remains latched until such time as the missile has left the carrier. A snubber J is provided and serves to retard or check movement of the mechanism as it is moved to or approaches the fully extended or firing position.

The carrier C, as provided by the present invention, may in practice be varied widely, depending upon the character or nature of the missile to be handled in an ordinary situation where the missile is of the general type illustrated in the drawings the carrier C may be characterized by a simple elongate tubular body 30 which is open at both ends and which corresponds in cross sectional configuration with the missile and is such as to slidably support the missile. In the particular case illustrated the missile is round in cross-section and the body of the carrier is of corresponding shape. In the particular case illustrated the body 30 is of substantially the same length as the missile and when the missile is within the body its fins 13 are held retracted, as shown in Fig. 7 of the drawings.

The mounting means D supports the tubular body of the carrier C so that it shifts between a retracted position where it is within the envelope 21 as shown at the left in Fig. 4, and an extended or firing position where it is forward of the retracted position and is laterally spaced from the envelope, as shown at the right in Fig. 4. In the case illustrated the mounting means G involves arm type brackets 31 pivoted to lugs 32 on the partition 27 by pivot pins 33. The outer ends of the arms are pivoted at the sides of the body 30 by pivot pins 34. In the particular case illustrated each bracket involves two arms which are alike and the arms of the two brackets are alike. Further, the mounting and arrangement is such that when the body of the carrier is retracted it is wholly within the elongate envelope of the appendage B and is parallel therewith, and it remains in such parallel position or relationship as it operates or moves outwardly to firing position where it is spaced laterally from the envelope.

In accordance with the present invention the closure section 25 that normally covers or closes the opening 24 in the shell 23 through which the carrier operates is fixed on the exterior of the body 30 of the carrier and coincides with or is in register with the shell 23 when the body of the carrier is retracted, as shown at the left in Fig. 4 of the drawings. As a result of this construction when the carrier is in or retracted it stores the missile within the vehicle or within the appendage of the vehicle, as the case may be, so that there is no undesirable projection on the exterior or skin of the vehicle.

The contact means E is carried by the body 30 of the carrier and is such as to make electrical contact with contact 13 of the missile when the missile is stored at or in the normal position within the body. In the case illustrated the contact means E involves a contact arm 40 and mounting means 41 for the arm supporting it so that it is pivoted and is insulated from the body 30. In the particular case illustrated the mounting means 41 involves a pivot pin 42 and the arm is supported on the pin through mounting bushings 43 of insulating material. A spring 44 is connected to the arm 40 and is suitably insulated therefrom and serves to normally yieldingly urge the arm so that the head 45 at its outer end is maintained in electrical contact with contact 13 of the missile. In practice a suitable control circuit may be completed to the missile from the arm 40 by connecting a control line L to the arm, as shown in the drawings.

The control means F is provided to normally releasably retain the missile in the body of the carrier until such time as the carrier has been operated to firing position. In the case illustrated the means F involves a detent arm 46 carried by a pivot pin 47 and having a beveled head 48 that is normally seated in the groove or recess 14 provided in the exterior of the missile. The pivot pin 47 is carried by a suitable jacket 49 on the exterior of body 30 and a spring 50 normally yieldingly urges the arm 47 to a position where the head 48 is maintained in the groove 14. The shape of the groove and of the head 48 is such, however, that when the arm 46 is free to move and sufficient thrust occurs tending to move the missile out of the carrier body, the arm is released, freeing the missile for forward movement. In accordance with the present invention a lock dog 51 is carried on a pivot pin 52 and normally engages and locks the arm 46 in position where the head 48 is engaged in the groove 14. A spring 51a normally yieldingly holds the dog 51 in the engaged or locked position, as shown in Fig. 8. A control rod 53 connects to the lock dog 51 and is connected to a working part of the mechanism so that the dog is released from the arm 46 when the missile carrier reaches firing position. In the particular case illustrated the control rod 53 is suitably coupled to one of the arm type brackets 31 of the mounting means, as shown in Figs. 3 and 9 of the drawings. The particular construction illustrated involves a guide 54 pivoted to a bracket of the mounting means by a pivot pin 55 and slidably passing the rod, as shown in Fig. 9. An adjustable stop 56 is provided on the rod 53 and a compression spring 57 is provided between the stop and the guide 54. From the drawings it will be apparent that this mechanism can be so adjusted or set that when the carrier C reaches the fully extended or firing position such as is shown in Figs. 3 and 4 of the drawings, the dog 51 is pulled away from the latch arm 46 so that the missile can pass from the carrier if sufficient thrust occurs to cause such discharge of the missile.

The latch means G serves to normally hold the mechanism in the in or retracted position and in the case illustrated it involves a latch dog 60 slidably mounted to cooperate with a notch 61 provided in one of the arm brackets 31 of the mounting means D. A spring 62 is suitably coupled to the latch dog 60 and serves to normally yieldingly hold the dog in position to enter the notch 61. The parts are positioned or related so that when the mounting means is collapsed so that the missile carrier is retracted the dog enters the notch 61.

In accordance with the present invention the means G is adapted to be released or operated by means of gases issuing from the missile. In the case illustrated a baffle or plate 65 is carried by a pivot pin 66 and is normally located in the path of gases that issue from the missile when the missile is within the envelope or shell 23. In the arrangement illustrated a rod 67 connects the plate 65 and the dog 60 so that when the plate is forced or swung rearwardly by gases from the missile the latch is retracted, freeing the mounting means so that the carrier can move to the firing position. In the case illustrated the spring 62 is shown coupled or connected to the rod 67.

The latch means H serves to catch and hold the mechanism in operating or firing position. The latch means H is such as to be engaged when the missile carrier reaches firing position and it remains engaged until the missile leaves the carrier.

The particular latch means H illustrated in the drawings involves a latch dog 70 mounted to cooperate with or engage a notch 71 in one of the arm brackets 31 of the mounting means. A spring 72 normally yieldingly urges the dog 70 to a position where it enters or is engaged in the notch 71. The notch 71 and the dog 70 are so located, as shown in Figs. 3, 5, and 6, that the dog registers with and enters the notch 71 when the carrier C reaches the fully extended or firing position.

The present invention provides means for releasing the latch dog 70 when the missile leaves the carrier. In the case illustrated the control for the latch dog 70 involves a trigger plate 75 engaged by and normally held out by the presence of the missile in the carrier C. The plate 75 operates in an opening 76 in the body of the carrier and is mounted to shift inwardly when the missile leaves the carrier. In the particular case illustrated the plate 75 is supported by means of pivoted links 78. One of the links 78 is operatively coupled to the latch dog 70 by an operating rod 79. A spring 80 is coupled to the parts just described as by being anchored at 81 and by being slackly linked to the rod 79 at 82. The spring 81 normally tends to urge the plate 75 inwardly and as soon as the missile has left the carrier C the spring 81 moves the plate 75 inwardly causing the arm 79 to move the dog 70 and thus retract it from the notch 71. In practice the plate 75 is located at the forward end portion of the body of the carrier C so that the plate 75 is not released until the rearmost portion of the missile issues from the carrier. As soon as the missile has left the carrier and the dog 70 has been released air pressure caused by forward movement of the vehicle or airplane will cause the carrier C to swing back to the retracted position to be caught and held by the means G.

The snubber J is provided to check or dampen the movement of the carrier as it reaches the firing position and in the case illustrated it is shown as involving a spring type shock absorbing unit 90 engaged by an extension 91 of one of the arm brackets 31 of means D.

From the foregoing description it will be apparent that the present invention provides a simple, compact, dependable mechanism and is such as to normally carry a missile such as a rocket type projectile so that it is entirely within or encased by the vehicle or by an appendage provided on the vehicle. When the missile is ignited and gases begin to issue therefrom such gases immediately operate the plate 65 and release the means G that normally holds the mechanism retracted. Such initial gases exhaust through or issue from a small opening 95 left at the rear end of the closure 25, as shown in Fig. 2 of the drawings. As forward thrust develops on the missile due to issuing gases the carrier C is swung out and forward until it reaches the launching position or firing position, such as is shown at the left in Figs. 3 and 4 of the drawings. It is to be noted that this operation of the mechanism is in the direction in which the vehicle is traveling and if it has any influence upon the flight or performance of the vehicle it is to thrust it forward rather than to create a drag that might interfere with normal operation or flight of the vehicle. In the case of a mechanism operated to project from the vehicle or from an appendage thereof without having the forward thrust above referred to, a highly undesirable drag occurs and may even deflect normal flight of the vehicle. When the carrier C reaches the fully extended or launching position the means F is released at the same time that the means H is engaged, and as a result the carrier C is held in firing position while the missile issues from the carrier C. When the missile finally leaves the carrier the means H is released and the stream of air flowing past the structure returns the carreir to the in or retracted position where it is caught and held by the means G. It is to be understood that with the mechanism provided by the present invention one or more units can be operated simultaneously and because operation as above described does not generate drag the missiles can be fired or discharged accurately.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, and detent means on the carrier retaining the missile therein until the carrier assumes the said launching position, the mounting being shifted by the reaction of the missile.

2. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, the mounting being shifted by the reaction of the missile, detent means on the carrier retaining the missile therein until the carrier assumes the said launching position, and means normally holding the carrier in the retracted position including a control element operated by gases issuing from the missile.

3. In combination, a vehicle, a shiftable blast powered missile carrier, and a pivotal mounting connecting the carrier and vehicle and operating to shift the carrier from a retracted position at the vehicle to a launching position spaced laterally from the vehicle and forward of the retracted position, the mounting being shifted by the reaction of the missile, detent means on the carrier retaining the missile therein until the carrier assumes the said launching position, and a latch means catching and holding the carrier in firing position and released by issue of the missile from the carrier.

4. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, the mounting being shifted by the reaction of the missile, and detent means releasably holding the missile in the carrier and operating to release the missile upon the carrier reaching the launching position.

5. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, the mounting being shifted by the reaction of the missile, detent means on the carrier retaining the missile therein until the carrier assumes the said launching position, means normally holding the carrier in the retracted position including a control element operated by gases issuing from the missile, and a latch means catching and holding the carrier in the launching position and released by issue of the missile from the carrier.

6. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, the mounting being shifted by the reaction of the missile, means normally holding the carrier in the retracted position including a control element operated by gases issuing from the missile, and detent means releasably holding the missile in the carrier and operating to release the missile upon the carrier reaching the launching position.

7. In combination, a vehicle, a shiftable blast powered missile carrier, a pivotal mounting connecting the carrier and vehicle and operating to shift the carrier from a retracted position at the vehicle to a launching position spaced laterally from the vehicle and forward of the retracted position, the mounting being shifted by the reaction of the missile, means normally holding the carrier in the retracted position including a control element operated by gases issuing from the missile, a latch means catching and holding the carrier in the launching position and released by issue of the missile from the carrier, and detent means releasably holding the missile in the carrier and operating to release the missile upon the carrier reaching the launching position.

8. A mechanism of the character described and including, a support, a rocket type missile carrier, a mounting pivoted to the carrier and to the support to operate the carrier from a retracted position to a launching position laterally spaced from the retracted position, and detent means on the carrier retaining the missile therein until the carrier assumes the said launching position, and a latch mounted on the carrier and engaged with the pivoted mounting when the carrier reaches the launching position and with a trigger plate engaged with the missile and released when the missile leaves the carrier thereby operating to disengage the latch.

9. A mechanism of the character described and including, a support, a rocket type missile carrier, a mounting pivoted to the carrier and to the support to operate the carrier from a retracted position to a launching position laterally spaced from the retracted position, detent means on the carrier retaining the missile therein until the carrier assumes the said launching position, a latch normally engaged with and holding the carrier in the retracted position and released by gases issuing from the missile when it is ignited, and a latch mounted on the carrier and engaged with the pivoted mounting when the carrier reaches the launching position and with a trigger plate engaged with the missile and released when the missile leaves the carrier thereby operating to disengage the latch.

10. A mechanism of the character described and including, a support, a rocket type missile carrier, a mounting pivoted to the carrier and to the support to operate the carrier from a retracted position to a launching position laterally spaced from the retracted position, a latch normally engaged with and holding the carrier in the retracted position and released by gases issuing from the missile when it is ignited, detent means on the carrier retaining the missile therein until the carrier assumes the said launching position, and a detent control normally retaining the missile in the carrier and released to free the missile upon the carrier reaching the launching position.

11. A mechanism of the character described and including, a support, a rocket type missile carrier, a mounting pivoted to the carrier and to the support to operate the carrier from a retracted position to a launching position laterally spaced from the retracted position, a latch normally engaged with and holding the carrier in the retracted position and released by gases issuing from the missile when it is ignited, a latch engaged with the carrier when the carrier reaches the launching position and held engaged so long as the missile is in the carrier, detent means on the carrier retaining the missile therein until the carrier assumes the said launching position, and a detent control normally retaining the missile in the carrier and released to free the missile upon the carrier reaching the launching position.

12. In combination, an aircraft having an appendage including a shell-like housing with a side opening, a shiftable blast powered missile carrier, and a mounting pivotally connecting the appendage and carrier for movement of the carrier from a retracted position within the housing to a launching position laterally spaced from the housing and forward of the retracted position, and detent means on the carrier retaining the missile therein until the carrier assumes the said launching position, the carrier including a closure element closing the opening in the housing when the carrier is retracted the mounting being shifted by the reaction of the missile.

13. In combination, an aircraft having an appendage with a chamber therein with an opening to the exterior of the aircraft, a shiftable blast powered missile carrier, and a mounting pivotally connecting the appendage and carrier for movement of the carrier from a retracted position in the chamber to a launching position laterally spaced from the exterior of the aircraft and forward of the retracted position, and detent means on the carrier retaining the missile therein until the carrier assumes the said launching position, the carrier having a closure section occupying said opening when the carrier is in the retracted position the mounting being shifted by the reaction of the missile.

14. A rocket launching device comprising: a shell of generally teardrop configuration having an opening in a wall portion thereof; a flush cover for said opening; means attaching said cover to said shell so that it may be moved from a first position closing said opening to a second position outwardly removed from said shell; a rocket launching tube mounted to move with said cover from a position within said shell to a position outwardly removed from said shell when said cover is moved to said second position thereby providing an unobstructed forward course for a rocket fired from said tube; the forward thrust of said rocket providing the necessary force to move said cover from said first to said second position thereof; and detent means in said tube retaining said rocket therein until said cover assumes said second position.

15. In an airplane having metal skin portions of which are generally parallel to the airflow past said airplane when in flight; portions of said skin defining an elongated opening extending in the direction of said airflow; a flush cover for said opening; means attaching said cover to said airplane so that it may be moved from a first position closing said opening to a second position outwardly removed from the skin of said airplane; a rocket launching tube attached to the inside of said cover; said cover and tube being movable from said first position of said cover to said second position thereof solely by thrust developed by a rocket fired from said tube; said rocket having free forward course when said cover is moved to said second position thereof; and detent means in said tube retaining said rocket therein until said cover assumes said second position.

References Cited in the file of this patent

UNITED STATES PATENTS

| | | |
|---|---|---|
| 2,398,871 | Turnbull | Apr. 23, 1946 |
| 2,409,210 | Jolly | Oct. 15, 1946 |
| 2,440,723 | MacDonald | May 4, 1948 |
| 2,451,522 | Uhl et al. | Oct. 19, 1948 |
| 2,470,120 | Walker | May 17, 1949 |
| 2,481,542 | Schuyler | Sept. 13, 1949 |
| 2,485,715 | Eastman | Oct. 25, 1949 |
| 2,585,030 | Nosker | Feb. 12, 1952 |
| 2,609,730 | Bergstrom | Sept. 9, 1952 |
| 2,701,985 | Smith | Feb. 15, 1955 |
| 2,709,947 | Woods | June 7, 1955 |
| 2,774,282 | Ballash et al. | Dec. 18, 1956 |

FOREIGN PATENTS

| | | |
|---|---|---|
| 171,502 | Germany | June 5, 1906 |
| 411,576 | Italy | Jan. 18, 1945 |
| 585,564 | Great Britain | Feb. 11, 1947 |
| 924,013 | France | Mar. 3, 1947 |
| 632,599 | Great Britain | Nov. 28, 1949 |